United States Patent [19]
Takahashi

[11] Patent Number: 5,884,012
[45] Date of Patent: Mar. 16, 1999

[54] METHOD AND APPARATUS OF STENCIL COMPOSITION PROCESS FOR COLOR PRINTING

[75] Inventor: Junji Takahashi, Ibaraki-ken, Japan

[73] Assignee: Riso Kagaku Corporation, Tokyo, Japan

[21] Appl. No.: 791,155

[22] Filed: Jan. 28, 1997

[30] Foreign Application Priority Data

Jan. 29, 1996 [JP] Japan .................................. 8-012869

[51] Int. Cl.$^6$ ............................ G06F 15/00; H04N 1/46; B41C 1/14
[52] U.S. Cl. .......................... 395/106; 395/109; 395/117; 358/515; 358/517; 358/537; 358/540; 101/128.4
[58] Field of Search ..................................... 395/106, 109, 395/117, 101; 101/128.4, 127.1, 129, 128.21; 358/500, 515, 517, 530, 537, 540; 345/113, 114, 150

[56] References Cited

U.S. PATENT DOCUMENTS

| | | | |
|---|---|---|---|
| 5,450,789 | 9/1995 | Hasegawa | 101/129 |
| 5,659,490 | 8/1997 | Imamura | 358/500 |
| 5,696,839 | 12/1997 | Siegeritz | 382/162 |
| 5,765,477 | 6/1998 | Yoshida | 101/128.4 |

*Primary Examiner*—Edward L. Coles
*Assistant Examiner*—Mark Wallerson
*Attorney, Agent, or Firm*—Kanesaka & Takeuchi

[57] ABSTRACT

A stencil composition processing apparatus for color printing comprises a contouring means which scans data of an original picture made up of multiple figures of different colors and detects the profile and color of each figure, a contact/proximity detection means which detects for each figure as to whether there exists any other figure of different color in contact with or close to a prescribed surrounding area of the figure, and a grouping control means which groups the figures into multiple groups each including figures that have different colors and are not in contact with nor close to each other based on data provided by the contact/proximity detection means and combines the figure groups so as to cover figures of all colors that make up the original picture.

12 Claims, 18 Drawing Sheets

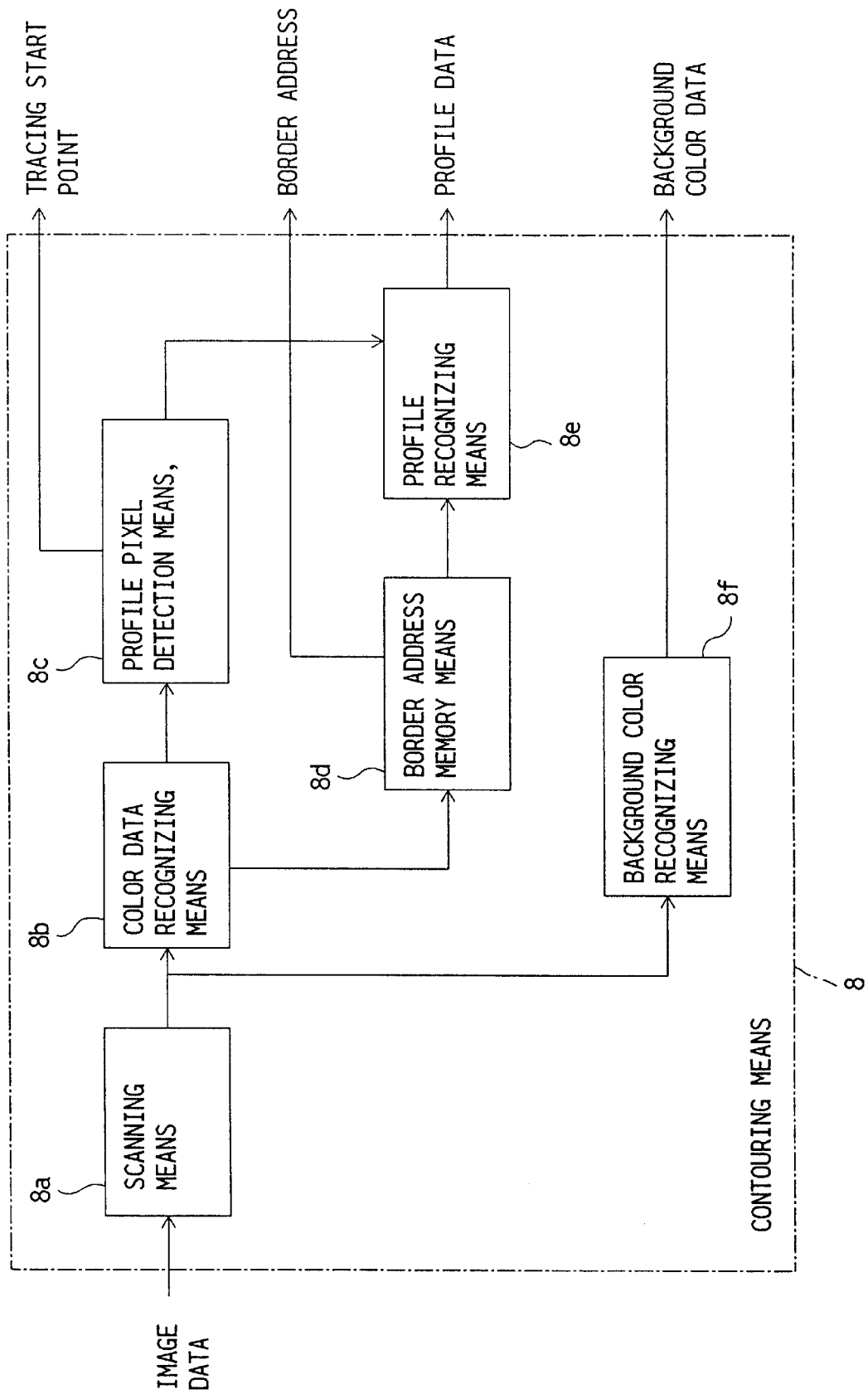

METHOD AND APPARATUS OF STENCIL COMPOSITION PROCESS FOR COLOR PRINTING

BACKGROUND OF THE INVENTION

The present invention relates to a method and apparatus of data processing for stencil composition which is carried out at the perforation of stencil sheets with a perforating device (e.g., printer, word processor, perforating machine), and to a method and apparatus of perforation process.

Multi-color printing based on stencils will first be explained. Initially, the operator displays a picture (e.g., sketch, illustration, image) on the screen of a processor such as a personal computer. The picture may be copied from an original picture by means of a scanner, or may be drawn and colored manually on the screen.

The operator separates the picture into multiple figures of different colors that make up the picture by operating the processor through the keyboard and mouse device. This image processing will be called here "stencil composition". Subsequently, perforating operations equal in number to the separated colors take place to produce stencil sheets.

In an example explained in the following, an original picture is made up of figures of seven colors (yellow, gray, yellow-green, blue, light-blue, green, and brown), as shown in FIG. 19A. The operator instructs the processor to read out data of the original picture and display it on the screen.

For the picture displayed, the operator carries out the color separation for extracting figures, each having one color, by erasing figures of other colors, resulting in seven figures of seven colors as shown in FIGS. 19B–19H. From these figures, seven stencil sheets for seven colors are produced.

Subsequently, printing operations take place with the seven stencil sheets which are registered and supplied with inks of the respective colors, thereby producing a complete print of color picture. The reason for the use of separate stencil sheets for individual colors is to avoid the mixing of inks of different colors existing in contact with or close to each other in case these inks would be fed to a single stencil sheet.

However, the foregoing multi-color printing scheme is deficient in that increasing the number of colors necessitates the increased number of stencil sheets, the increased number of registering operations and the increased number of repetitive printing operations, resulting in an increased operator's work and increased overall print time.

SUMMARY OF THE INVENTION

In view of the foregoing problems, it is an object of the present invention to provide a method and apparatus of data processing for stencil composition and to a method and apparatus of perforation process, all being capable of minimizing the number of stencil sheets thereby to reduce and simplify the operator's work significantly and reduce the overall print time.

A stencil composition processing apparatus set forth in claim 1 comprises contouring means which scans data of an original picture made up of multiple figures of different colors and detects the profile and color of each figure, contact/proximity detection means which detects for each figure as to whether there exists any other figure of different color in contact with or close to a prescribed surrounding area of the figure, and grouping control means which groups the figures into multiple groups each including figures that have different colors and are not in contact with nor close to each other based on data provided by the contact/proximity detection means and combines the figure groups so as to cover figures of all colors that make up the original picture.

A stencil composition processing apparatus set forth in claim 2, which is derived from claim 1, includes perforation means which implements the perforation of stencil sheets separately for individual figure groups based on the combination of groups obtained by the grouping control means.

A stencil composition processing apparatus set forth in claim 3, which is derived from claim 2, includes mode selection means which selects one of stencil composition processing mode in which the contouring means, contact/proximity detection means and grouping control means operate in unison to produce stencil composition data for multiple stencil sheets of an original picture and perforation processing mode in which the perforation means operates based on the stencil composition data obtained in the stencil composition processing mode.

A stencil composition processing apparatus set forth in claim 4 is derived from claim 3, wherein, in case there is more than one combination of figure groups that covers figures of all colors, the grouping control means compares the shortest distances, each being between figures within a group, among all combinations of figure groups, and selects a combination of figure groups of the longest distance.

A stencil composition processing apparatus set forth in claim 5, which is derived from claim 3, includes means of evaluating the number of figures and number of colors based on data of profiles and colors of figures obtained by the contouring means.

A stencil composition processing apparatus set forth in claim 6, which is derived from claim 3, includes means of detecting the presence or absence of a background color of an original picture based on the detection of the color of a portion other than the figures of the original picture.

A stencil composition processing apparatus set forth in claim 7 is derived from claim 6, wherein, in response to the detection of a single background color in the original picture by the background color detection means, the perforation means implements the perforation for the background color portion separately from the figures.

A stencil composition processing method set forth in claim 8 comprises a first step of scanning data of an original picture made up of multiple figures of different colors and detecting the profile and color of each figure, a second step of detecting for each figure as to whether there exists any other figure of different color in contact with or close to a prescribed surrounding area of the figure, a third step of grouping the figures into multiple groups each including figures that have different colors and are not in contact with nor close to each other, and a fourth step of combining the figure groups so as to cover figures of all colors that make up the original picture.

A stencil composition processing method set forth in claim 9, which is derived from claim 8, includes a fifth step of implementing the perforation separately for each figure group based on the combination of figure groups obtained by the fourth step.

A stencil composition processing method set forth in claim 10 is derived from claim 8, wherein, in case there is more than one combination of figure groups that covers figures of all colors, the fourth step compares the shortest distances, each being between figures within a group, among all combinations of figure groups, and selects a combination of figure groups of the longest distance.

A stencil composition processing method set forth in claim 11, which is derived from claim 8, evaluates the number of figures and number of colors of figures based on data of profiles and colors of figures obtained by the first step.

A stencil composition processing method set forth in claim 12, which is derived from claim 9, detects the color of a portion other than the figures of an original picture, and, in response to the detection of a single background color of the original picture, implements the perforation for the background color portion separately from the figures.

According to the present invention, in case figures of different colors of an original picture have their print positions spaced out by a certain distance or more, these figures can be composed together so as to share a stencil sheet, whereby the number of stencil sheets for printing the picture can be minimized.

BRIEF DESCRIPTION OF THE DRAWINGS

FIG. 4 is a functional block diagram of the contouring means of the apparatus;

DESCRIPTION OF THE PREFERRED EMBODIMENT

The stencil composition apparatus based on an embodiment of this invention will be explained by first making reference to FIG. 1, FIG. 2 and FIGS. 3A–3C. In the following explanation of the embodiment, an original picture which undergoes the stencil composition process is assumed to be made up of figures of seven colors which are yellow, gray, yellow-green, green, blue, light-blue and brown on a white background as shown in FIG. 3A.

Figure 1:
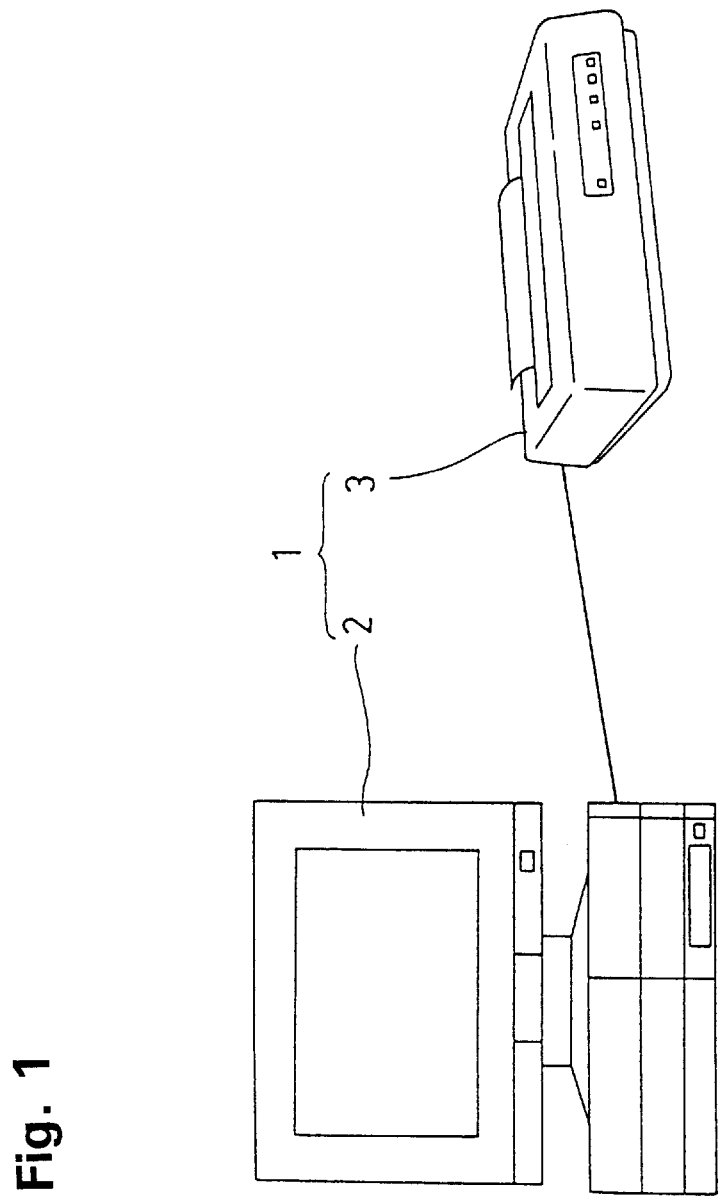
FIG. 1 is a diagram showing the external view of the stencil composition processing apparatus of this invention.

In FIG. 1, the stencil composition processing apparatus 1 is made up of a processor 2 which is a personal computer, and a perforating device 3 which is connected electrically to the processor 2 by a cable.

Figure 2:
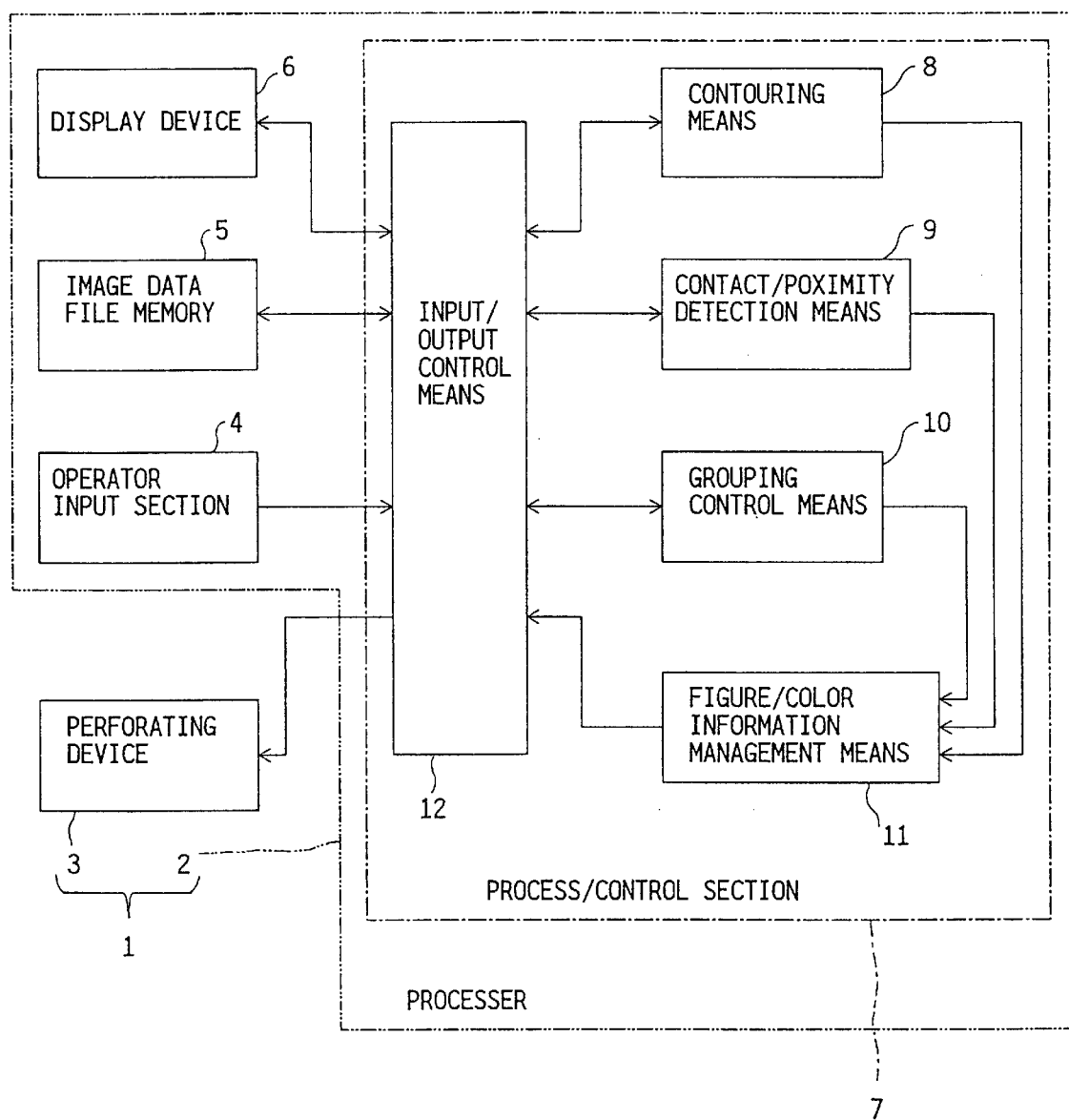
FIG. 2 is a functional block diagram of the apparatus.
Figure 3A:
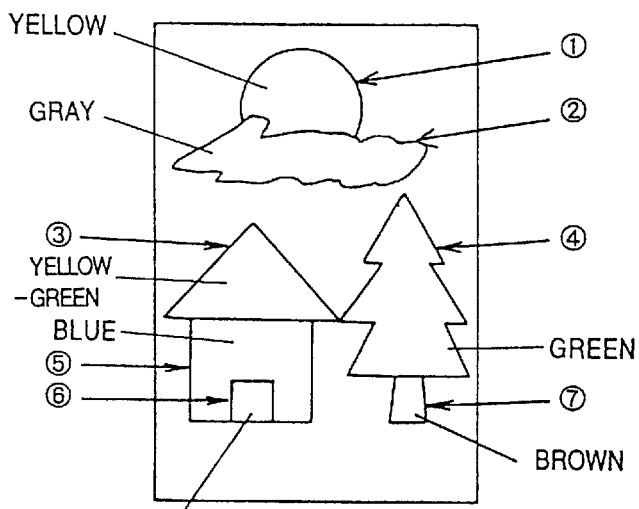
FIGS. 3A, 3B and 3C are diagrams showing image data before and after the stencil composition process implemented by the apparatus.
Figure 3B:
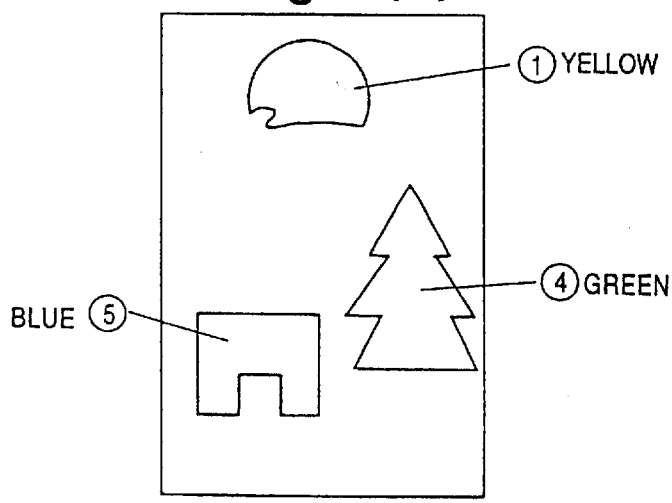
Figure 3C:
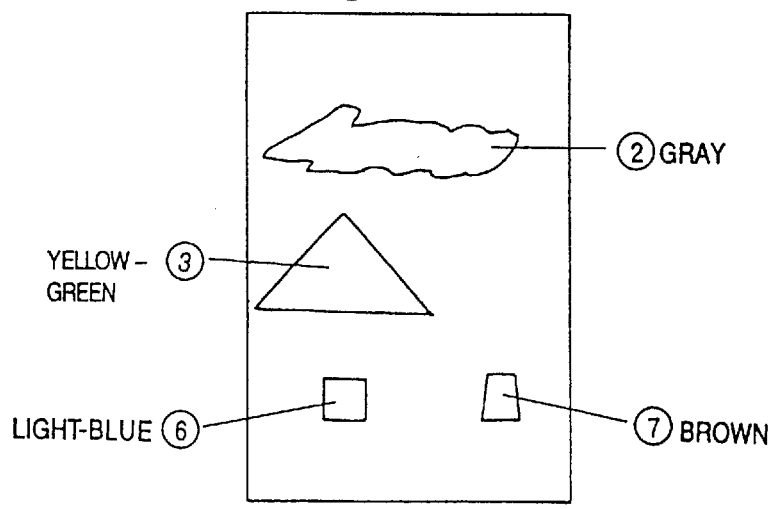

In FIG. 2, the processor 2 includes an operator input section 4, a image data file memory 5, a display device 6 and a process/control section 7. The operator input section 4 includes a keyboard and a mouse device, for example, and is used by the operator for entering instructions to the process/control section 7. Specifically, the operator instructs the readout of image data to be processed for stencil composition from the file memory 5, selects a mode of automatic stencil composition process for the readout image data, specifies a color for a displayed figure, specifies an area for the entry of a range figure which will be explained later, selects a mode of perforating process by the perforating device 3, and specifies a number of stencils for the perforating operation.

The image data file memory 5 stores image data of pictures to be edited on the screen of the display device 6. Pictures including sketches, illustrations, etc. can be drawn on the screen of the display device 6 by use of the operator input section 4 or can be introduced from outside by means of a scanner such as an image scanner or TV scanner (not shown). A picture is made up of numerous pixels, and each pixel has associated color data of a certain number of bits (e.g., 8 bits) for each of red the (R), green (G) and blue (B) components. Accordingly, each pixel has its color determined by the combination of bits of three pieces of color data.

The image data file memory 5 also stores data resulting from the editing process by the process/control section 7, and the display device 6 also displays the progress of stencil composition process by the process/control section 7.

The process/control section 7 transacts image data with the file memory 5, delivers image data to the display device 6 and implements the stencil composition process in the stencil composition processing mode, or delivers image data to the perforating device 3 in the perforation processing mode. The process/control section 7 includes a contouring means 8, a contact/proximity detection means 9, a grouping control means 10, a figure/color information management means 11, and input/output control means 12, as shown in FIG. 2.

In FIG. 4, the contouring means 8 includes a scanning means 8a, a color data recognizing means 8b, a profile pixel detecting means 8c, a border address memory means 8d, a profile recognizing means 8e, and a background color recognizing means 8f.

The scanning means 8a carries out the main scanning and subordinate scanning across the picture area of the display device 6 where image data to be edited is displayed. The color data recognizing means 8b recognizes color data of pixels during the scanning of the picture area by the scanning means 8a and detects as to whether the immediate pixel has color data different from that of the pixel scanned previously.

Figure 6:
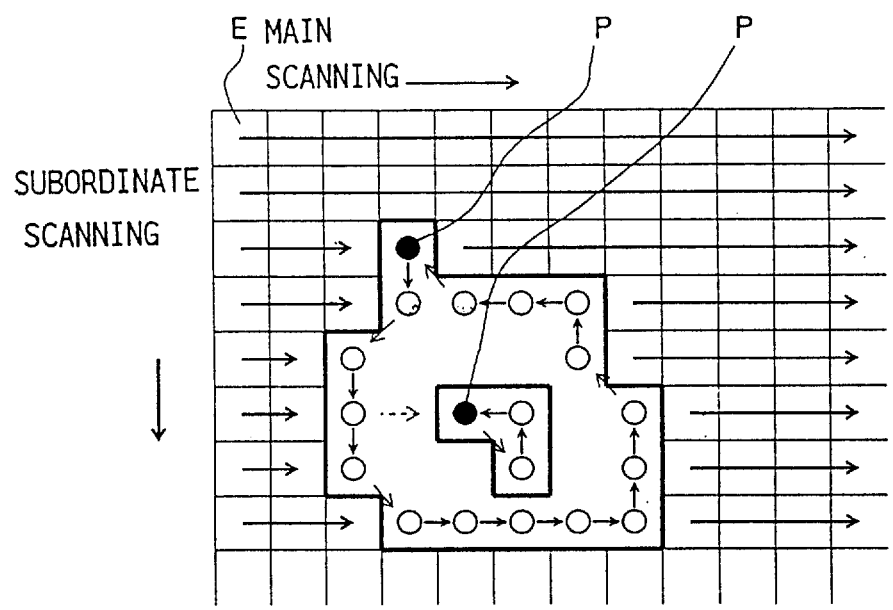
FIG. 6 is a diagram used to explain the contouring operation of the apparatus.
Figure 7:
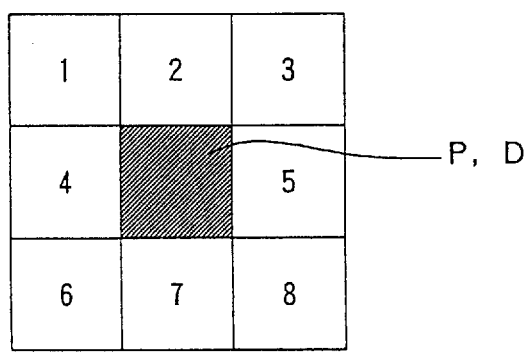
FIG. 7 is a diagram used to explain the profile pixel detecting operation in the contouring operation of the apparatus.

The profile pixel detecting means 8c responds to the detection of different color data of immediate pixel by the color data recognizing means 8b to set the pixel address for the tracing start point (shown by P in FIG. 6), and examines eight pixels shown in FIG. 7 around the start point pixel P as to whether these pixels have the same color data as of the start point pixel P.

The border address memory means 8d memorizes addresses of pixels having color data different from those of previous pixels as border addresses in response to the detection by the color data recognizing means 8b. The profile recognizing means 8e recognizes as a profile the area defined by the border addresses held in the border address memory means 8d.

The background color recognizing means 8f detects the presence or absence of a background color based on color data of pixels sampled during the scanning by the scanning means 8a across a certain range starting from the top left corner of the picture area. Specifically, if color data of white (RGB data of all 0's bits) continue during the scanning of the range, it recognizes the absence of background color, or if color data of some color continue at a constant tone across the range, it recognizes the presence of a background color.

Figure 5:
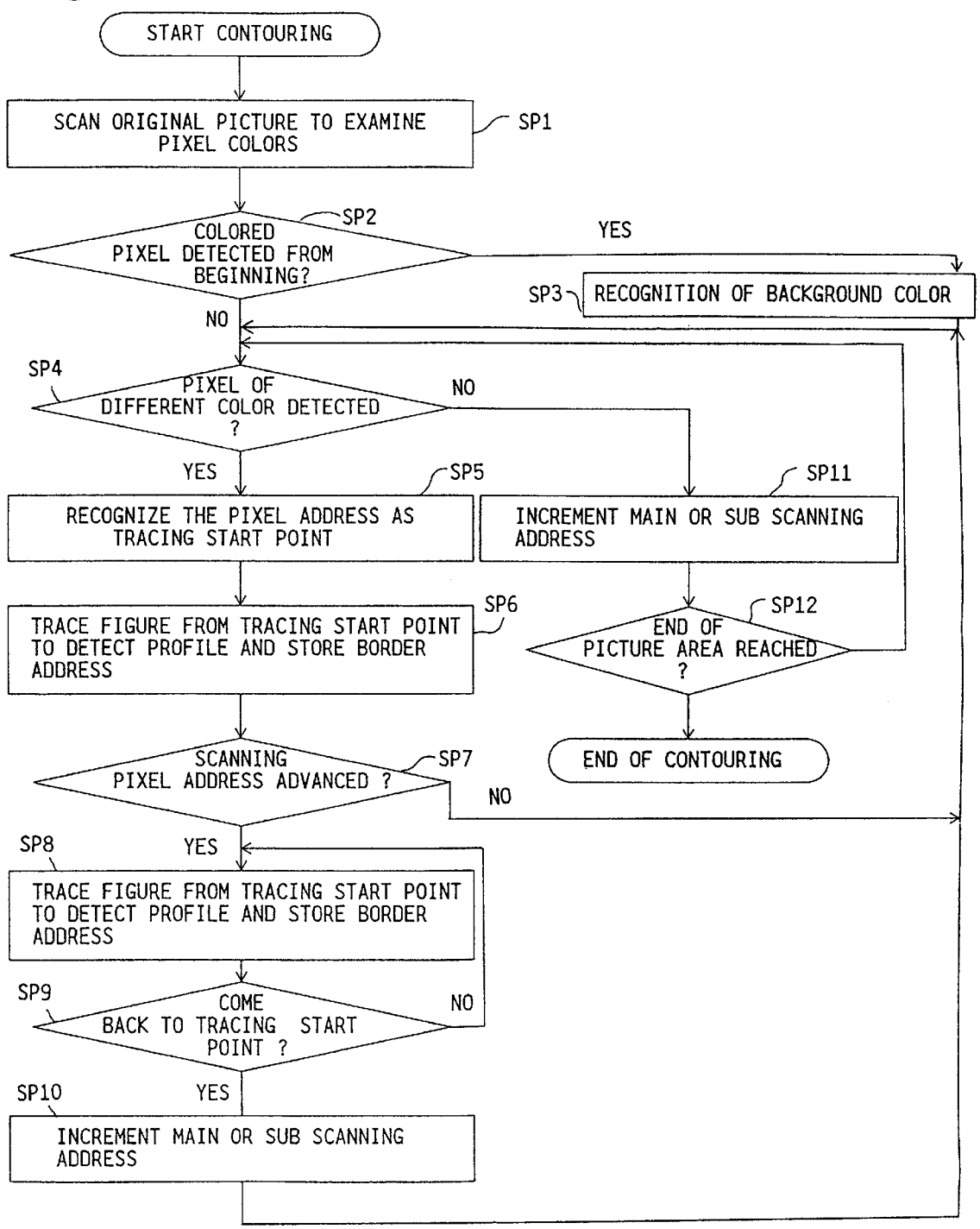
FIG. 5 is a flowchart explaining the contouring operation of the apparatus.

The contouring means 8 implements the contouring operation sequentially as shown by the flowchart of FIG. 5 thereby to extract profiles of figures of individual colors out of the picture displayed on the display device 6. Resulting profile data is stored in the image data file memory 5 by way of the figure/color information management means 11 and input/output control means 12.

More specifically, the contouring means 8 carries out the main scanning of the picture area E where the picture to be printed is displayed by starting from the top-left corner as shown in FIG. 6 thereby to examine color data of each pixel:(step SP1). If color data indicates a same color (other than white) continuously from the beginning within the prescribed range during the scanning:(step SP2:yes), it recognizes the presence of a background color:(step SP3). The background color data is held by the figure/color information management means 11.

When the contouring means 8 detects color data different from that of the previous pixel:(step SP4:yes), it sets the address of that pixel for the tracing start point P:(step SP5). Subsequently, it examines eight pixels around the start point pixel P as the object pixel D, as shown in FIG. 7, as to whether these surrounding pixels have the same color data as of the pixel D. If a pixel having the same color data is detected, the address of the pixel is held as a border address by the figure/color information management means 11 and this pixel is designated for a new object pixel D:(step SP6). The border address is also stored in the file memory 5.

In case none of the eight surrounding pixels has the same color data as of the object pixel D and therefore the pixel address does not advance:(step SP7:no), the operational sequence returns to step SP4. Otherwise, in case the pixel address advances following the detection of a pixel having the same color data as of the object pixel (step SP7: yes), the address of the pixel is held as a border address in the figure/color information management means 11 and file memory 5:(step SP8), and color data of the eight pixels around the new object pixel is examined. This operation is repeated until the object pixel comes back to the tracing start point P:(step SP9:yes).

The main or subordinate scanning address is incremented to have another scanning operation:(SP10), and the operational sequence returns to step SP4. At step SP4, if color data same as that of the previous pixel is not detected, the main or subordinate scanning address is incremented to have another scanning:(step SP11). The scanning operation terminates when the scanning position reaches the end of the picture area E:(step SP12:yes), or otherwise it continues by returning to step SP4:(step SP12:no).

In the example of FIG. 7, if more than one pixel among eight pixels around the object pixel D has the same color data as that of pixel D, the pixel address advances in a direction based on the priority order, of down-left, down, down-right, right, up-right, up, up-left, and left.

Figure 8:
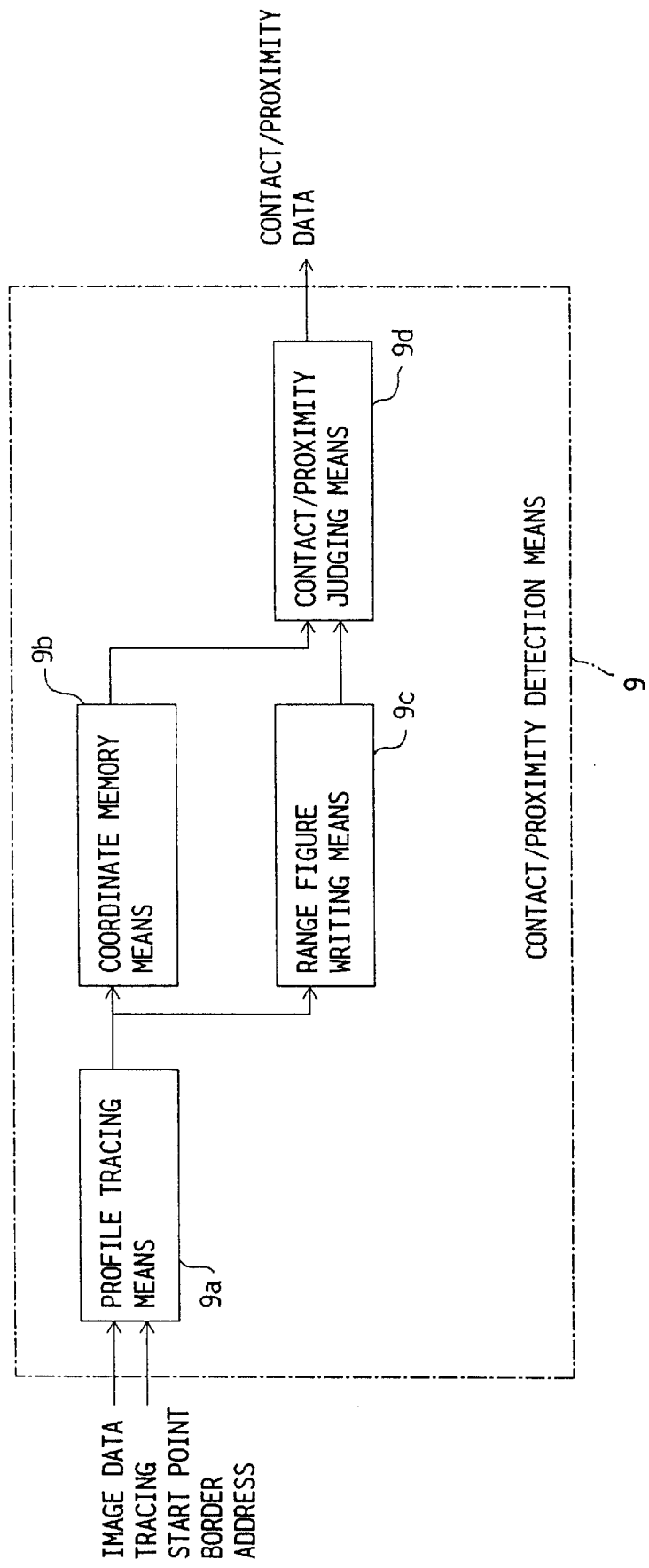
FIG. 8 is a functional block diagram of the contact/proximity detection means of the apparatus.

In FIG. 8, the contact/proximity detection means 9 includes a profile tracing means 9a, a coordinate memory means 9b, a range figure writing means 9c, and a contact/proximity judging means 9d.

The profile tracing means 9a traces the profile of a figure in the picture displayed in the picture area of the display device 6 based on the border addresses for each tracing start point P held in the border address memory means 8d. The coordinate memory means 9b memorizes xy coordinate values of a basic figure F for perforation detected by the profile tracing means 9a.

Figure 9:
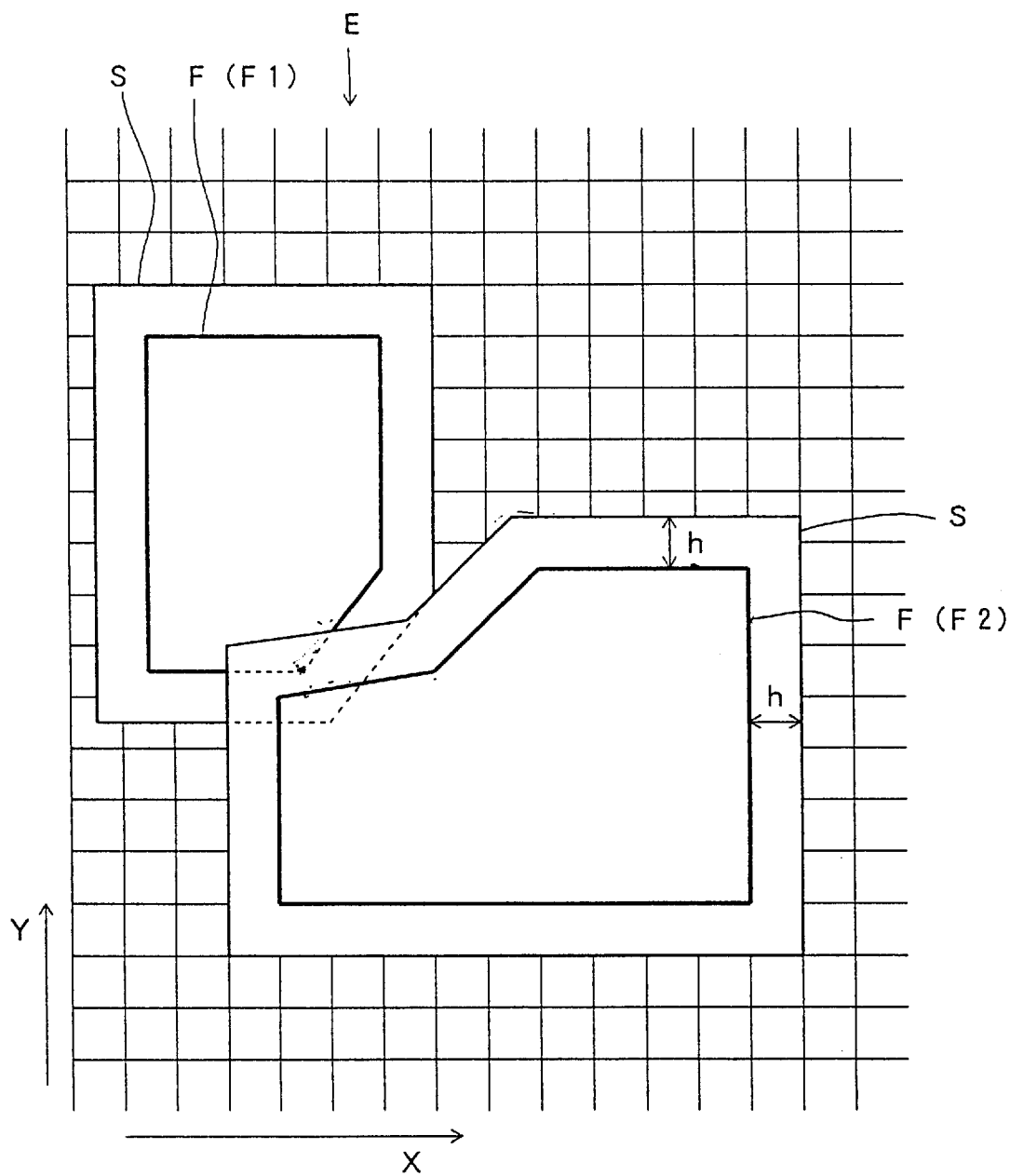
FIG. 9 is a diagram used to explain the contact/proximity detecting operation of the apparatus.

The range figure writing means 9c draws a range figure S which covers the basic figure F created by the profile tracing means 9a, with its marginal band of a prescribed width h (e.g., 2 mm) surrounding the figure F as shown in FIG. 9. The contact/proximity judging means 9d judges as to whether the range figure S written by the range figure writing means 9c is in contact with or close to other basic figure F in terms of xy coordinate values. In the example of FIG. 9, the range figure S for a basic figure F2 overlaps with other basic figure F1, i.e., the basic figure F2 is judged to be close to the basic figure F1 in this case.

Figure 10:
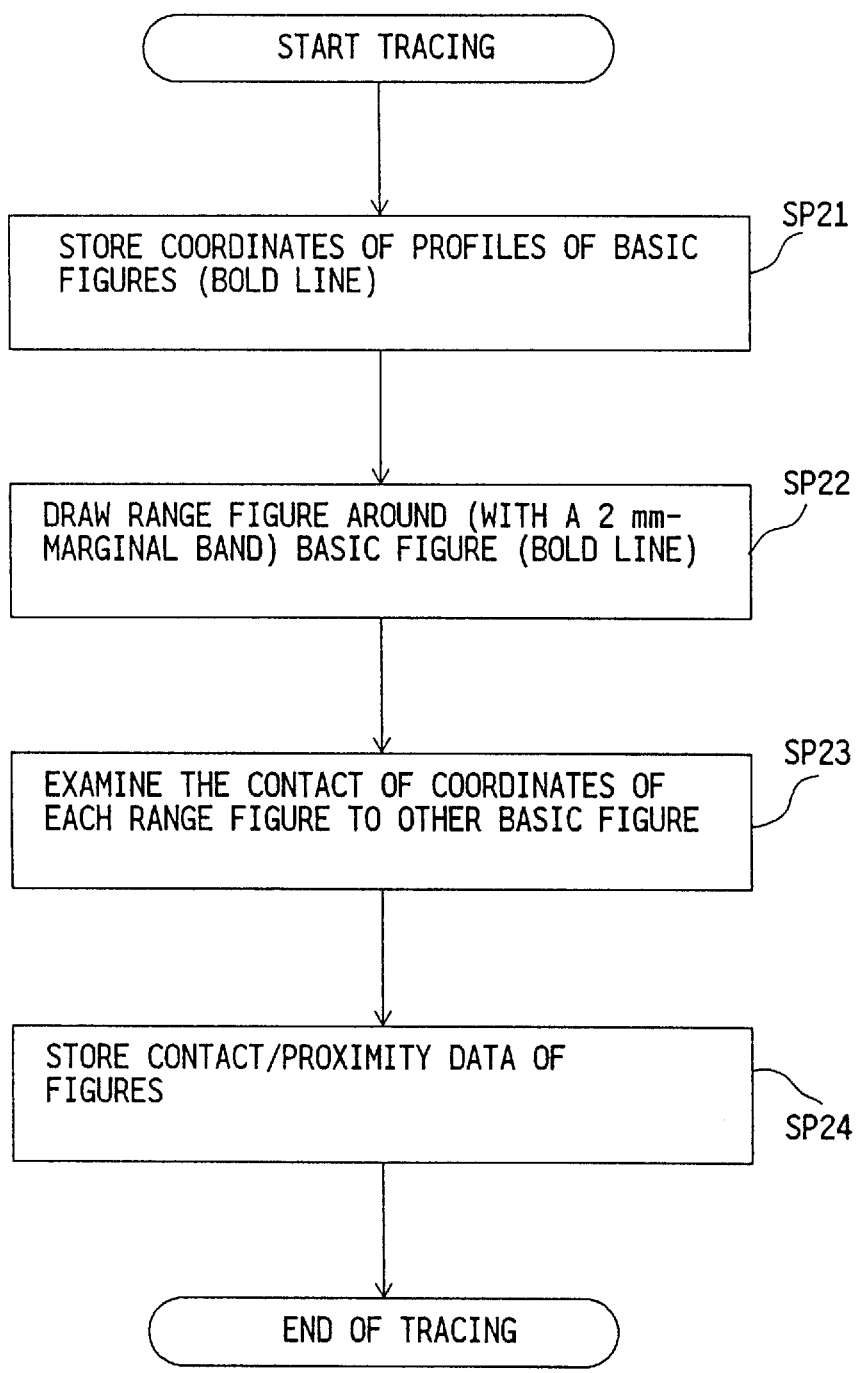
FIG. 10 is a flowchart explaining the contact/proximity detecting operation of the apparatus.

The contact/proximity detection means 9 implements the contact/proximity detecting operation sequentially as shown by the flowchart of FIG. 10 thereby to detect the contact or proximity state of individual figures of different colors extracted by the contouring means 8. Resulting contact/proximity data is stored in the file memory 5 by way of the figure/color information management means 11 and input/output control means 12.

More specifically, the contact/proximity detection means 9 traces the profile of individual figures of different colors based on the border addresses held in the figure/color information management means 11 thereby to recognize basic figures F for perforation, and memorizes their xy coordinate values (profile coordinates):(step SP21). Subsequently, it draws range figures S having a marginal band of 2 mm, for example, around the basic figures F:(step SP22), while examining as to whether each range figure S is in contact with other basic figure F: (step SP23). In the example of FIG. 3A, the contact/proximity detection means 9 produces contact/proximity data indicative of contacts between FIGS. 1 and 2, between FIGS. 3 and 4, between FIGS. 3 and 5, between FIGS. 4 and 7, and between FIGS. 5 and 6. The contact/proximity data is memorized in the figure/color information management means 11 and file memory 5:(step SP24).

Figure 11:
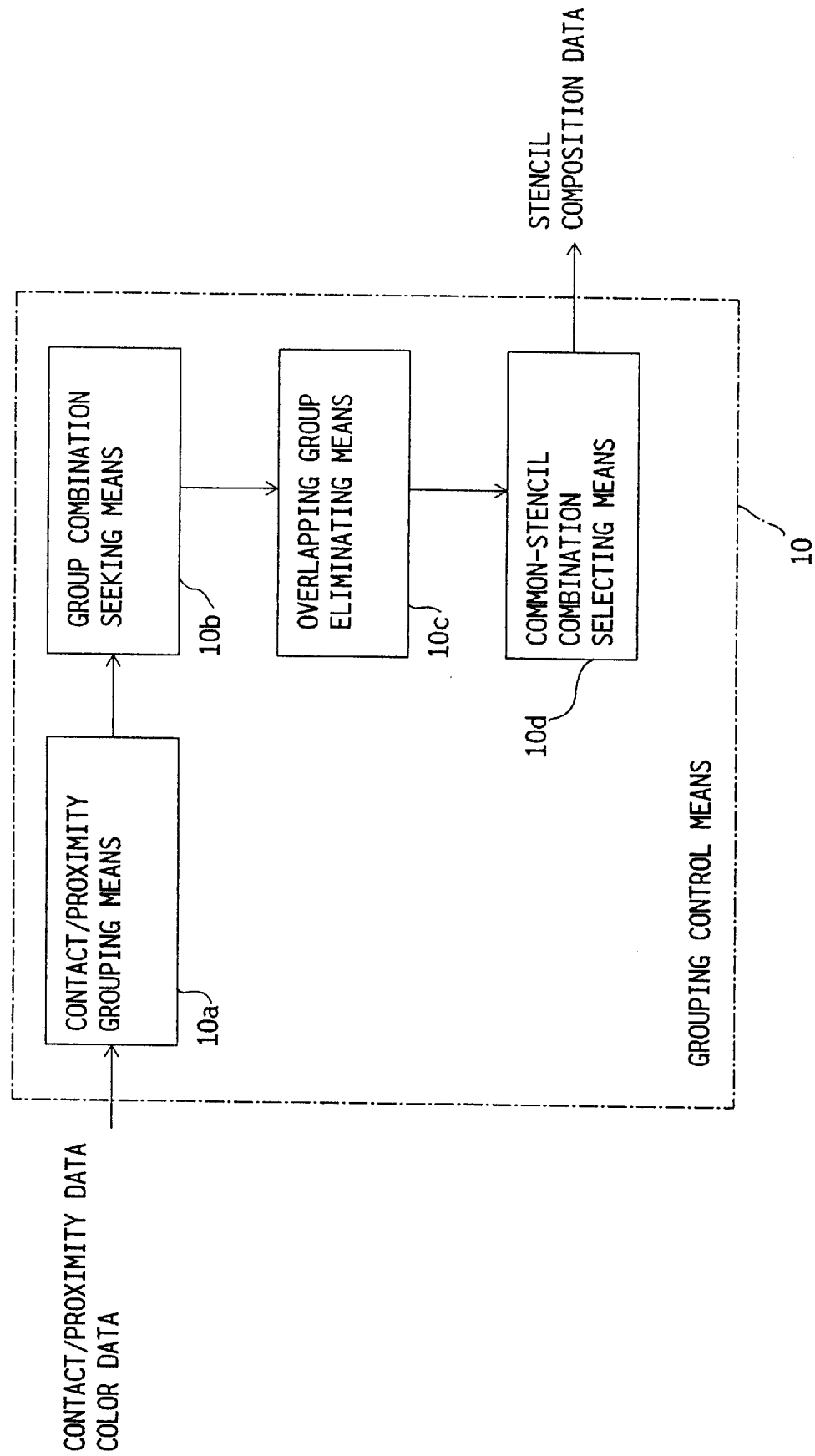
FIG. 11 is a functional block diagram of the grouping control means of the apparatus.
Figure 12:
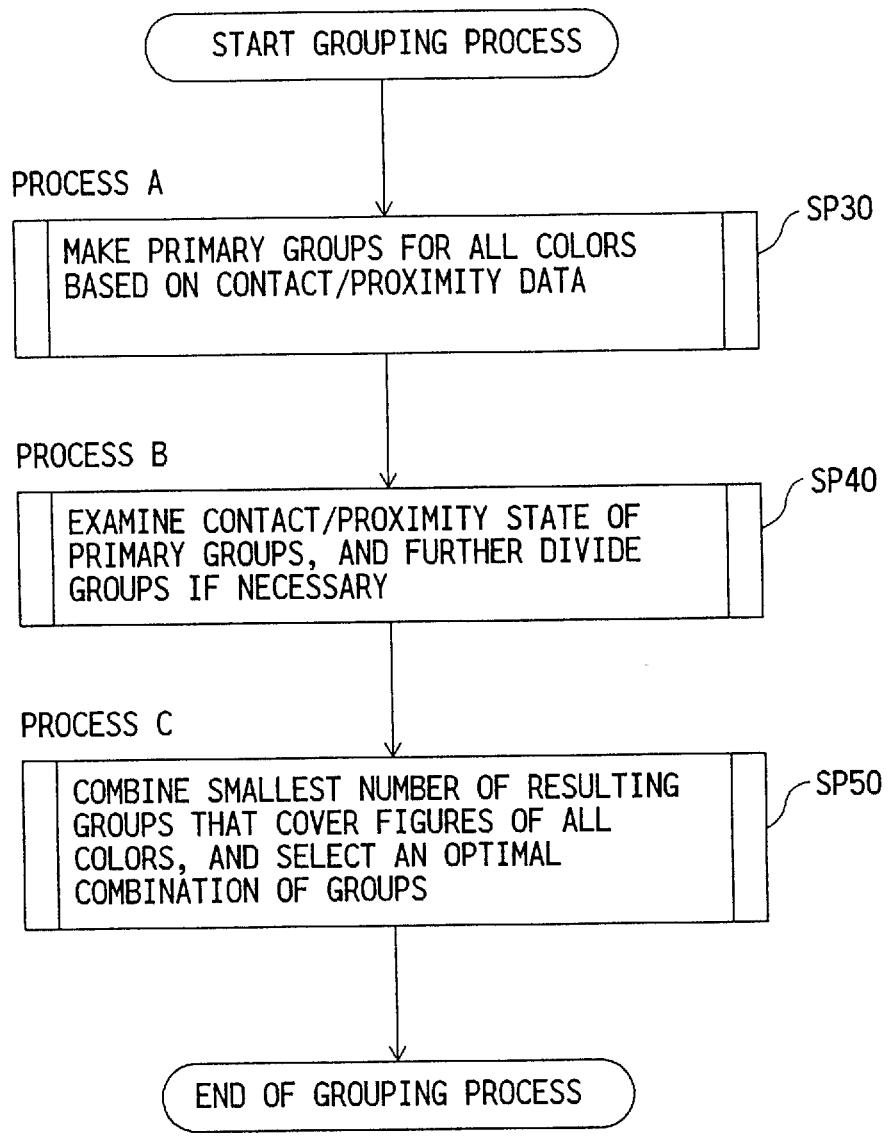
FIG. 12 is a flowchart explaining the grouping operation of the apparatus.

In FIG. 11, the grouping control means 10 includes a contact/proximity grouping means 10a, a group combination seeking means 10b, an overlap group eliminating means 10c, and a common-stencil combination selecting means 10d.

The contact/proximity grouping means 10a makes figure groups by combining figures of individual colors with other figures of other colors that are not in contact with nor close to them based on the contact/proximity data. Accordingly, the number of figure groups is equal to the number of kinds of colors of figures. For example, a group is formed for blue figures by including figures that have other colors and are not in contact with nor close to the blue figures.

The group combination seeking means 10b seeks a combination of figures with colors that can share a common stencil among the figure groups made by the contact/proximity grouping means 10a. The seeking operation takes place sequentially as follows. Figures are numbered based on their colors. In the example of FIG. 3A, a yellow figure has number 1, a gray figure has number 2, a yellow-green figure has number 3, a green figure has number 4, a blue figure has number 5, a light-blue figure has number 6, and a brown figure has number 7.

For figures of each group of a color in attention, reference is made to figures of other colors sequentially in the ascending order of figure number thereby to find figures that are not in contact with nor close to the figures, and groups including figures of the color in attention and figures of other colors that are not in contact with nor close to each other are sought. This seeking is carried out so that the number of figures grouped is as large as possible.

The overlap group eliminating means 10c removes overlapping groups from the result of seek by the group combination seeking means 10b. The common-stencil combination selecting means 10d combines several groups so that all colors are included in the combined groups out of the groups that are left after the eliminating process by the overlap group eliminating means 10c. In case there are more than one combination of groups, the common-stencil combination selecting means 10d selects an optimal combination of groups having the longest inter-figure distance among the groups.

The grouping control means 10 implements the grouping operation (processes A, B and C) sequentially as shown by the flowcharts of FIGS. 12 through 15 thereby to produce several groups of figures that can share a common stencil sheet and select finally one combination that covers all colors.

Figure 13:
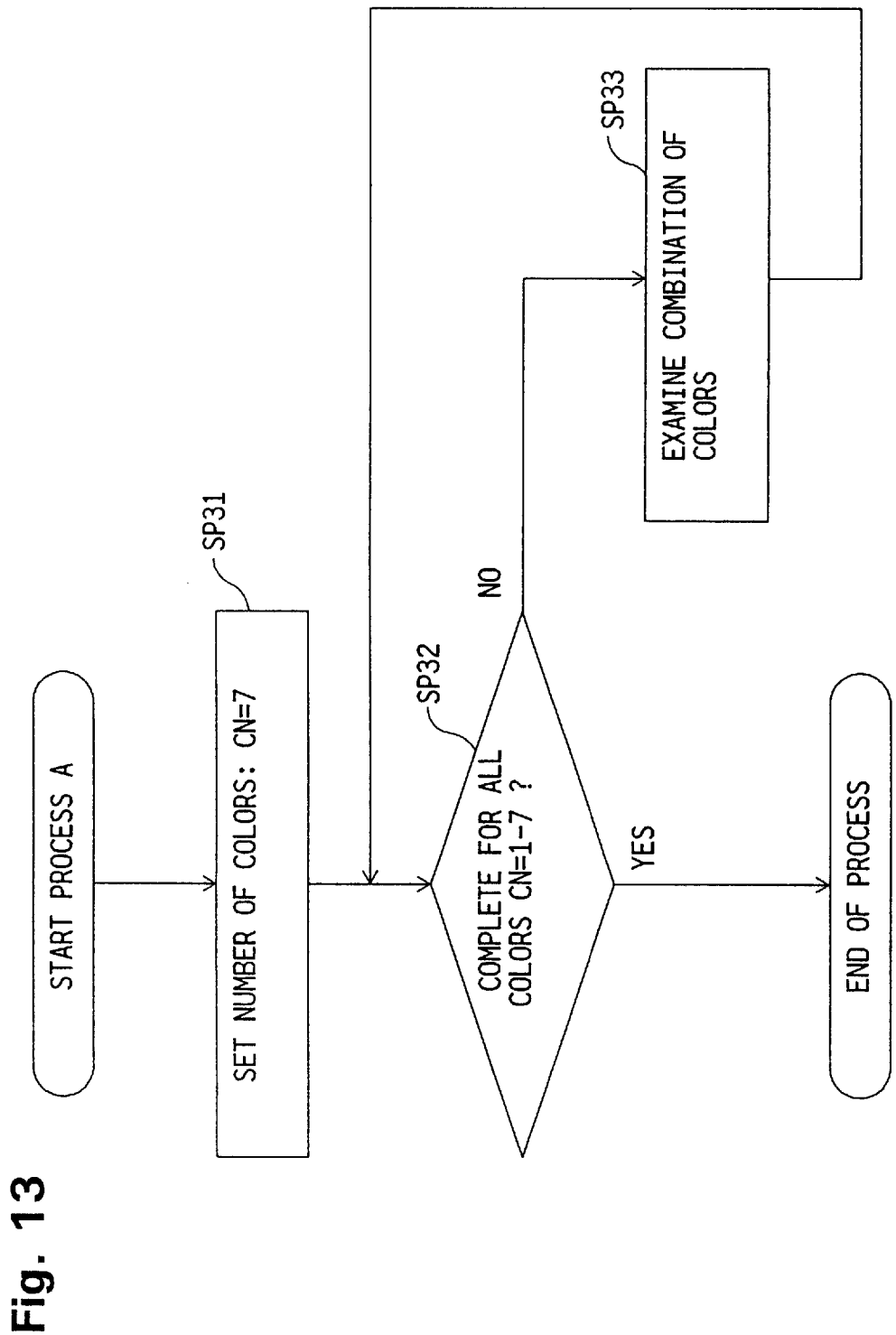
FIG. 13 is a flowchart of process A in the grouping operation of the apparatus.

Process A makes primary groups of figures based on the contact/proximity data resulting from the tracing operations of figures of individual colors:(step SP30). Specifically, figures of different colors that are not in contact with nor close to each other are examined for each color as shown in FIG. 13. In the example of FIG. 3A using seven colors, figures of different colors that can be combined with a figure of a certain color based on being not in contact with nor close to each other for the sharing of a common stencil are examined for individual figures of seven colors:(steps SP31 and SP32). In case there is more than one figure of a same color, examination is implemented for each figure. Figures of a same color in contact with or close to each other are treated as a single figure.

The process A produces group 1 through group 7 for figures of seven colors 1–7 as follows.

Group 1: Combination of figures of colors 1,3,4,5,6 and 7 in which the figure of color 1 is not in contact with nor close to the other figures.

Group 2: Combination of figures of colors 2,3,4,5,6 and 7 in which the figure of color 2 is not in contact with nor close to the other figures.

Group 3: Combination of figures of colors 1,2,3,6 and 7 in which the figure of color 3 is not in contact with nor close to the other figures.

Group 4: Combination of figures of colors 1,2,4,5 and 6 in which the figure of color 4 is not in contact with nor close to the other figures.

Group 5: Combination of figures of colors 1,2,4,5 and 7 in which the figure of color 5 is not in contact with nor close to the other figures.

Group 6: Combination of figures of colors 1,2,3,4,6 and 7 in which the figure of color 6 is not in contact with nor close to the other figures.

Group 7: Combination of figures of colors 1,2,3,5,6 and 7 in which the figure of color 7 is not in contact with nor close to the other figures.

Figure 14:
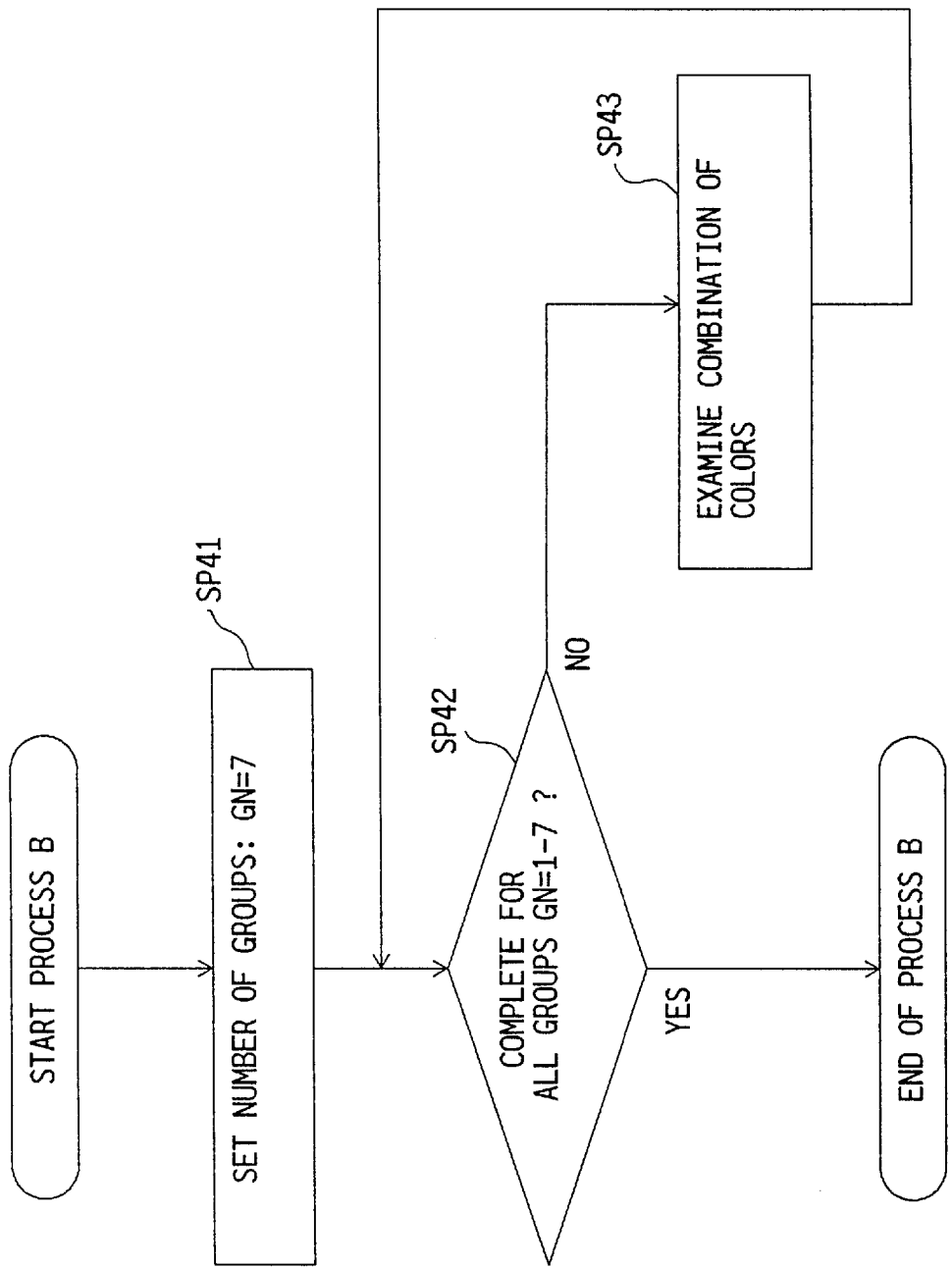
FIG. 14 is a flowchart of process B in the grouping operation of the apparatus.

Process B examines the contact/proximity state among figures of individual colors within each group of the groups 1–7 obtained in the process A, and selects combinations of colors that can share a common stencil from among colors included in each group thereby to make secondary groups: (step SP40). Specifically, the process B takes place sequentially as shown by the flowchart of FIG. 14. For the figure of the principal color in each of the groups 1–7, it makes reference to figures of other colors included in the group in the ascending order of figure number thereby to find ones that are not in contact with nor close to the figure. It seeks a combination that includes as many figures as possible inclusive of the figure of the principal color. In the example of FIG. 3A having seven groups 1–7, combinations of figures that can share a same stencil are examined for individual figures of seven colors 1–7:(steps SP42 and SP43).

For example, for FIG. 1 of the principal color of group 1, the process B makes reference to figures of other colors in the order from 3 to 4 to 5 to 6 and to 7, finding combinations of 1-3-6-7,1-4-5,1-5-7,1-6-7, and 1-7 that can share a same stencil. Similarly, for FIG. 2 of group 2, it finds possible combinations of 2-3-6-7,2-4-5,2-4-6,2-5-7,2-6-7, and 2-7. Combinations that allow the sharing of a stencil are sought for the remaining group 3–7.

Figure 15:
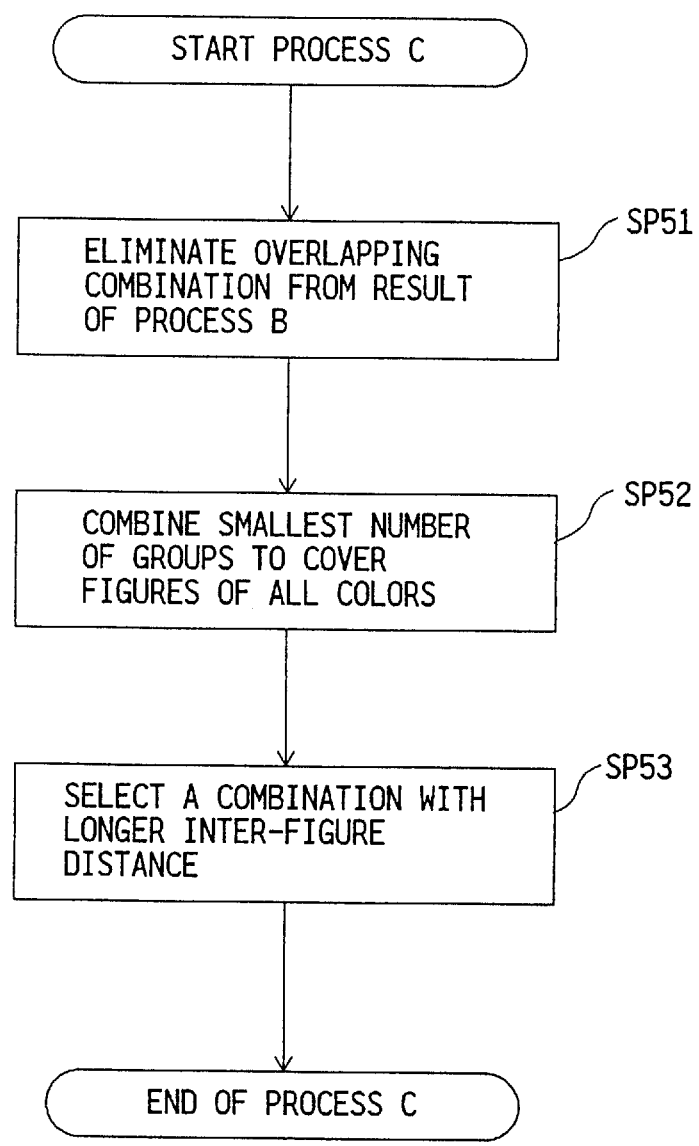
FIG. 15 is a flowchart of process C in the grouping operation of the apparatus.

Process C eliminates the overlapping of combination in the groups resulting from the process B, combines a smallest number of groups that cover figures of all colors out of the groups remaining after the overlap elimination, and selects an optimal combination of groups as stencil composition data:(step SP50). Specifically, the process C takes place sequentially as shown by the flowchart of FIG. 15. It eliminates the overlapping of combination from the combinations of groups resulting from the process B:(step SP51), leaving combinations of 1-3-6-7,1-4-5,1-4-6,1-5-7,2-3-6-7, 2-4-5,2-4-6, and 2-5-7 that allow the sharing of a same stencil.

Subsequently, the process C combines a smallest number of groups that cover figures of all colors out of the remaining groups:(step SP52), resulting in two kinds of combinations of groups 1-3-6-7 and 2-4-5, and 1-4-6 and 2-3-6-7.

In the case of the presence of more than one combination of groups, as in this example, a group with the shortest distance between figures in the group is sought in each combination of groups, and a combination of groups of the longest distance is selected for the stencil composition data:(step SP53). In the example of FIG. 3A, the shortest distance between figures in the two groups of 1-3-6-7 and 2-4-5 arises between 2 and 4, and the shortest distance between figures in the two groups of 1-4-5 and 2-3-6-7 arises between 4 and 5. Since the distance between 4 and 5 is longer than the distance between 2 and 4, the combination of 1-4-5 and 2-4-6-7 is selected for the stencil composition data.

Figure 16:
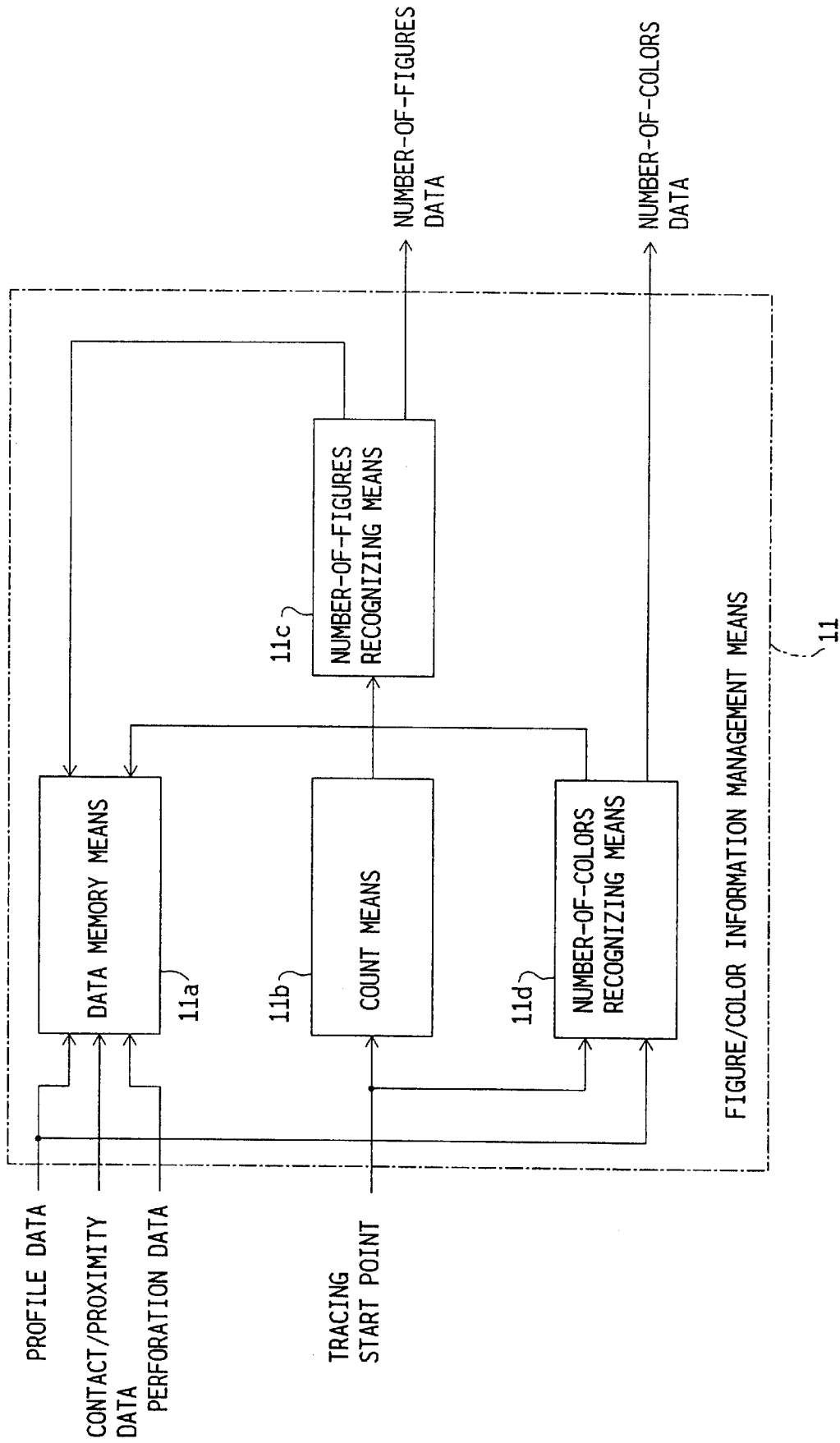
FIG. 16 is a functional block diagram of the figure color information management means of the apparatus.

In FIG. 16, the figure/color information management means 11 includes a data memory means 11a, a count means 11b, a number-of-figures recognizing means 11c, and a number-of-colors recognizing means 11d.

The data memory means 11*a* memorizes the contact/proximity data provided by the contact/proximity detection means 9 and the stencil composition data provided by the grouping control means 10. These data are also stored in the image data file memory 5 by way of the input/output control means 12. The count means 11*b* counts the number of tracing start points P of profiles, i.e., number of figures, recognized by the contouring means 8. The number-of-colors recognizing means 11*d* recognizes the unitary of color or the number of colors based on the color data of the figure for each tracing start point P. The resulting number-of-figures data and number-of-colors data (including data for combinations of same colors) are stored in the data memory means 11*a* and also stored in the image data file memory 5 by way of the input/output control means 12.

Figure 17:
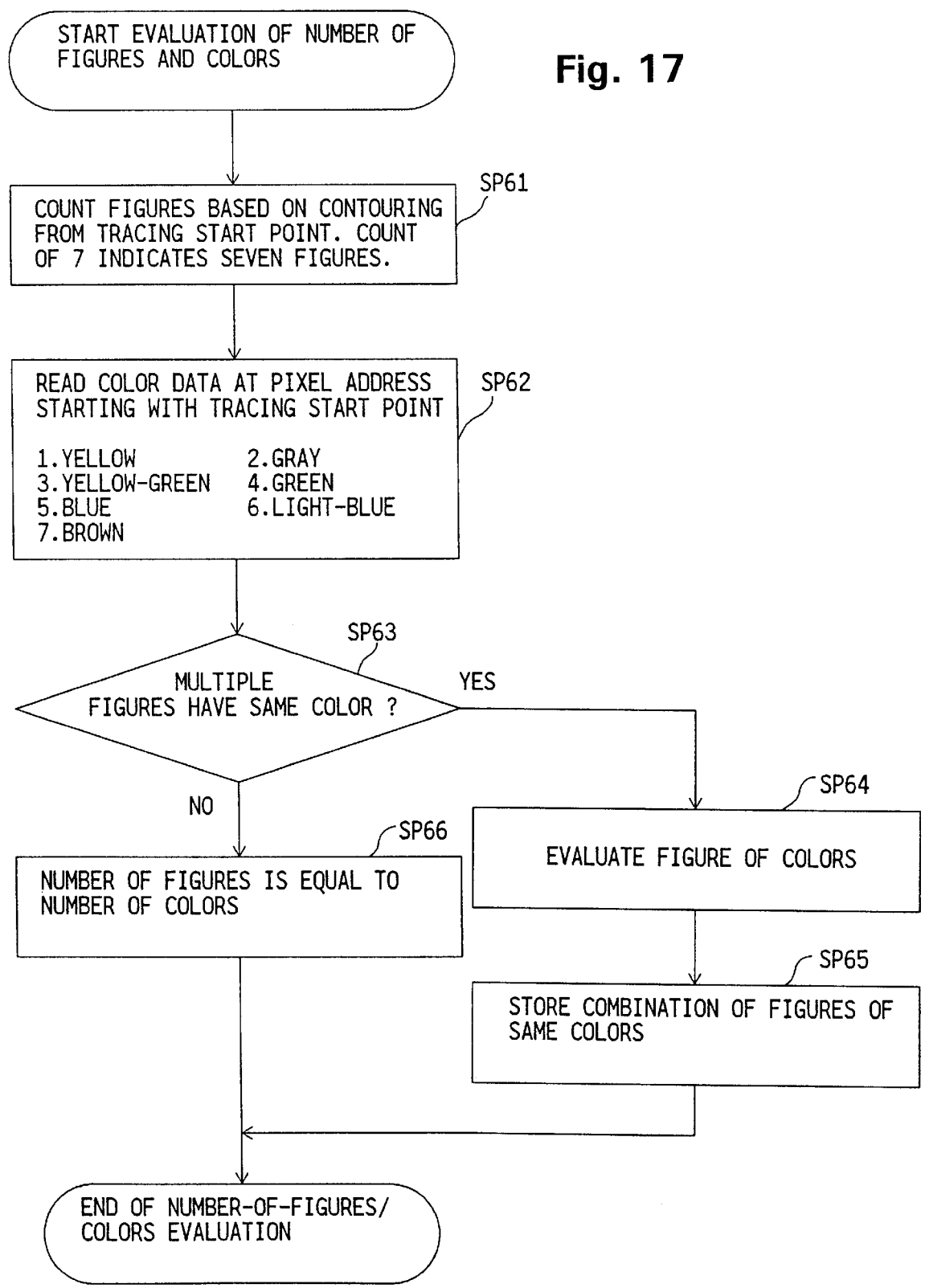
FIG. 17 is a flowchart explaining the operation of evaluating the number of figures and number of colors implemented by the apparatus.

The figure/color information management means 11 implements the operations of recognizing the number of figures and number of colors sequentially as shown by the flowchart of FIG. 17. Initially, it counts the number of tracing start points P which are recognized during the contouring process:(step SP61). In the example of FIG. 3A, the number of tracing start points P is seven, and accordingly the number of figures is also seven. Subsequently, it reads out color data at the pixel address of each tracing start point P:(step SP62). In the example of FIG. 3A, color data of yellow 1, gray 2, yellow-green 3, green 4, blue 5, light-blue 6, and brown 7 are read for the individual figures.

If more than one figure has a same color:(step SP63:yes), it is counted as one color in totaling the number of colors: (step SP64). Combinations of figures of same colors are memorized:(step SP65). In case there are no two or more figures having a same color:(step SP63:no), the number of colors is equal to the number of figures:(step SP66). In the example of FIG. 3A, each figure has a unique color, and accordingly the number of colors is seven that is equal to the number of figures. The resulting number-of-figures data and number-of-colors data are stored in the image data file memory 5 by way of the input/output control means 12.

The input/output control means 12 controls the data transaction and sequential operates of the perforating device 3, operator input section 4, image data file memory 5, display device 6, contouring means 8, contact/proximity detection means 9, grouping control means 10, and figure/color information management means 11.

The perforating device 3, which is a printer, word processor or perforation machine for example, operates in the perforation processing mode selected by the operator input section 4 to perforate stencil sheets in accordance with the perforation data which is transferred from the image data file memory 5 under control of the process/control section 7. The perforation data includes the stencil composition data, number-of-figures data, number-of-colors data, contact/proximity data, and picture area data.

Figure 18:
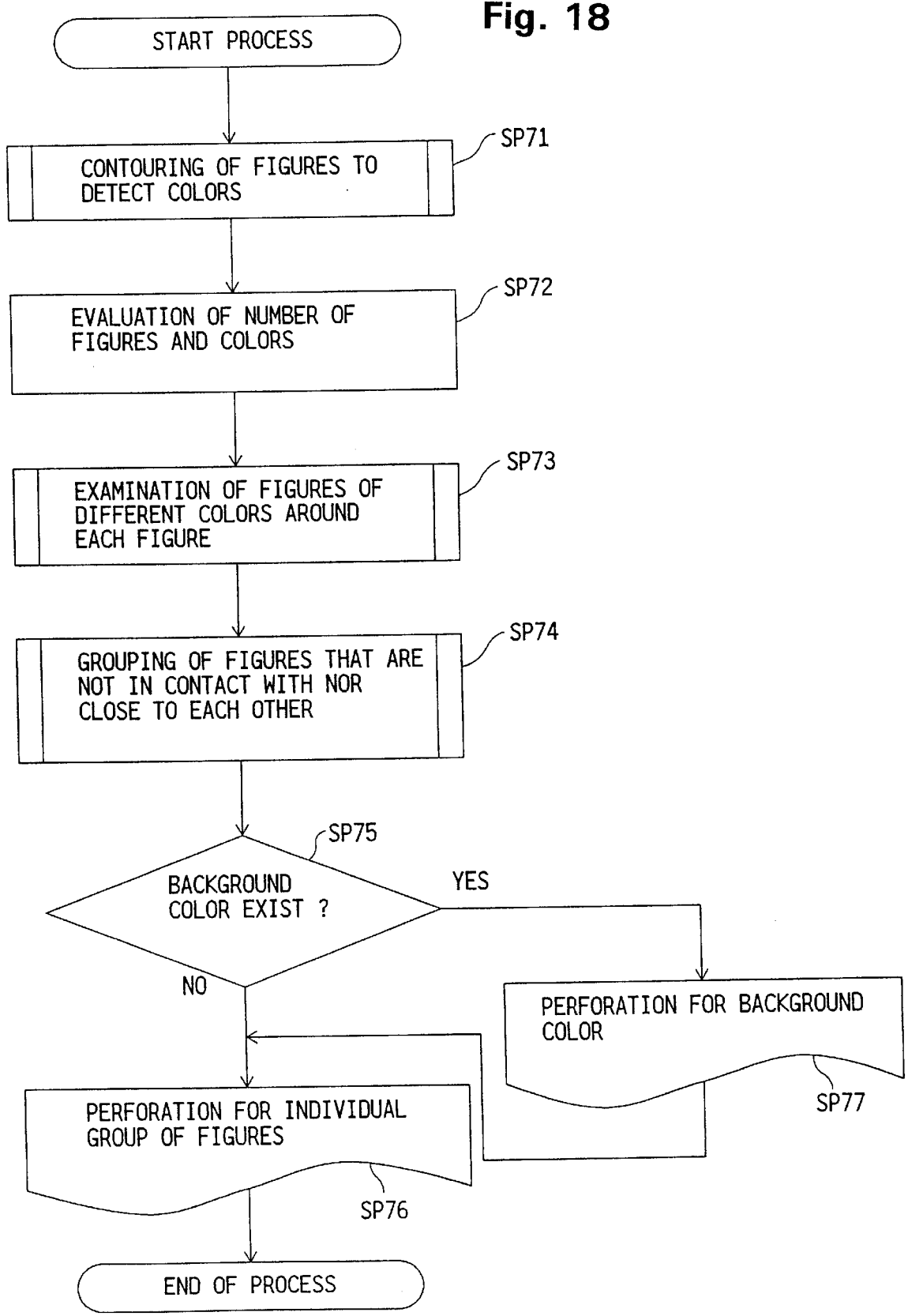
FIG. 18 is a flowchart explaining the stencil composing operation and perforating operation of the apparatus.
Figure 19A:
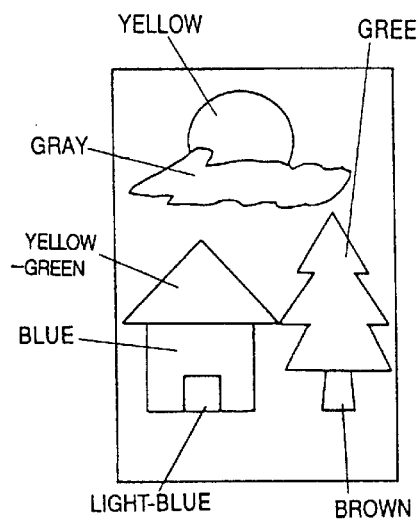
FIGS. 19A through 19H are diagrams showing image data before and after the conventional stencil composition process.
Figure 19B:
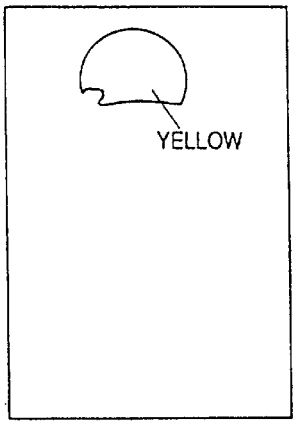
Figure 19C:
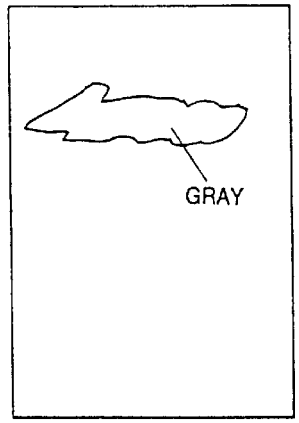
Figure 19D:
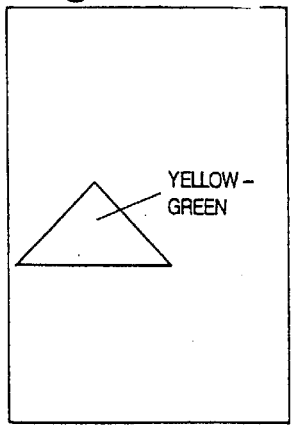
Figure 19E:
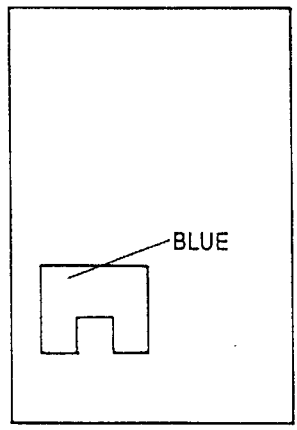
Figure 19F:
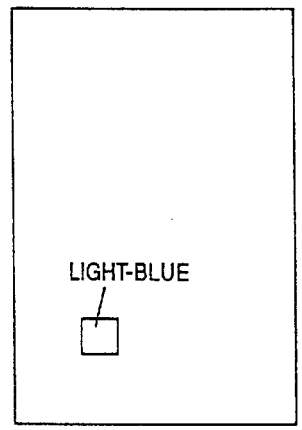
Figure 19G:
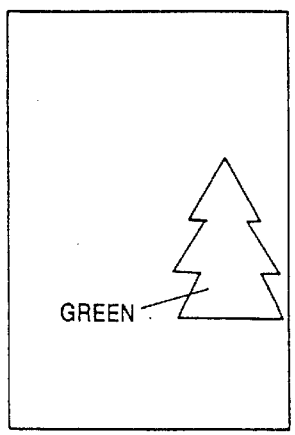
Figure 19H:
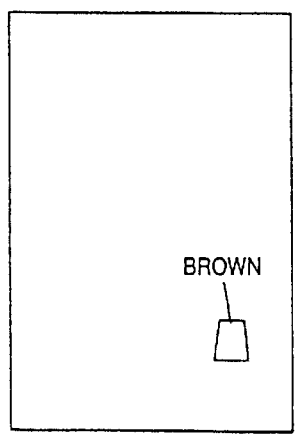

The overall perforating operation by the stencil composition processing apparatus arranged as described above will be explained in connection with the flowchart of FIG. 18.

With the perforation processing mode being selected by the operator input section 4, image data which is the source of printing is read out of the image data file memory 5. The picture is displayed on the display device 6 and the contouring operation shown in FIG. 5 is carried out to extract profiles of figures of all colors:(step SP71).

On completion of the contouring operation, the number of figures and the number of colors are recognized:(step SP72). In the example of FIG. 3A, these numbers are both seven. Upon recognizing the number of figures and number of colors, the contact/proximity examining operation shown in FIG. 10 is carried out to detect as to whether there is any figure of a different color in the periphery of a figure of each color: (step SP73).

On completion of the contact/proximity examining operation for all figures of all colors, the grouping operation shown in FIG. 12 through FIG. 16 is carried out to group figures of colors that are not in contact with nor close to each other based on the contact/proximity data:(step SP74), and an optimal combination of groups that allows the sharing of a stencil is selected. In the example of FIG. 3A, the combination of 1-4-5 and 2-3-6-7 is selected. The stencil composing operation completes.

Following the stencil composing operation, the perforation processing mode is selected by the operator input section 4. In case the contouring operation has recognized the absence of background color: (step SP76:no), perforation of stencil sheets is carried out for individual groups separately based on the combination of groups selected by the stencil composition process:(step SP76). In the example of FIG. 3A, the background color is white, and accordingly the perforating operation takes place for a stencil sheet of colors 1,4 and 5 and a stencil sheet of colors 2,3,6 and 7. If, otherwise, the picture has a background color:(step SP75:yes), the perforating operation takes place first for a stencil sheet of the background color:(step SP77), and next the perforating operation takes place separately for individual groups selected by the stencil composition process: (step SP76).

According to the foregoing embodiment, once the perforation processing mode is selected for a picture displayed, image data can be processed for stencil composition automatically without the need of any operator's intervention. By selecting the perforation processing mode on completion of the stencil composition process, stencil sheets can be produced automatically based on the data obtained in the stencil composition processing mode.

In case there exist multiple figures of different colors in a picture area E, these figures can be perforated on two or more stencil sheets separately such that figures of different colors are spaced out by a prescribed distance or more from each other on each stencil so that inks of different colors do not mix. By perforating figures of multiple colors that are not in contact with nor close to each other on a same stencil sheet, the number of stencil sheets can be minimized. Consequently, the number of printing operations and stencil registering operations can be reduced, the operator's work can be reduced significantly, and the overall print time can be shortened.

During the stencil composition process, in case there is more than one combination of figure groups that covers figures of all colors, the grouping control means 10 compares the shortest distances, each being between figures within a group, among all combinations of groups, and selects a combination of groups of the longest distance. Accordingly, it becomes possible to select only one combination of figure groups that is optimal for the creation of stencil sheets. The stencil sheets of figure groups resulting from the selection of a combination by the stencil composition process allows of a small misregistration of stencil sheets at printing and prevents the mixing of inks of different colors.

The number-of-figures recognizing means 11*c* in the figure/color information management means 11 determines the number of figures based on the counting of tracing start points P that are determined by the contouring means 8. The number-of-colors recognizing means 11*d* determines the number of colors of figures based on the color data of tracing start points P in the contoured figures. Accordingly, in case there is more than one figure of a same color within the picture area E, these figures can be treated together for the stencil composition process.

The background color recognizing means 8*f* in the contouring means 8, recognizes the presence or absence of a background color for the figures in the picture area E, and if a color of a constant tone other than white is recognized continuously, indicative of the presence of a background color, this background color can be perforated separately from the figures.

According to the present invention, as described above, once the perforation processing mode is selected for a picture displayed, image data can be processed for stencil composition automatically without the need of any operator's intervention. Even if there is more than one figure of different colors in the picture, it is possible to combine figures of different colors such that these figures are spaced out by a prescribed distance or more.

By selecting the perforationing process mode on completion of the stencil composition process, stencil sheets can be produced automatically based on the data obtained in the stencil composition processing mode. Since figures of multiple colors that are not in contact with nor close to each other are combined on a same stencil sheet, the number of stencil sheets can be minimized. Consequently, the number of printing operations and stencil registering operations can be reduced, the operator's work can be reduced significantly, and the overall print time can be shortened.

During the stencil composition process, in case there is more than one combination of figure groups that covers figures of all colors, the shortest distances, each being between figures within a group, are found and compared among all combinations of groups, and a combination of groups of the longest distance is selected for stencil composition data. Accordingly, it becomes possible to select only one combination of figure groups that is optimal for the creation of stencil sheets. The stencil sheets of figure groups resulting from the selection of a combination by the stencil composition process allows of a small misregistration of stencil sheets at printing and prevents the mixing of inks of different colors.

The number of figures and number of colors of the figures are determined based on the data of profiles and colors of figures provided by the contouring means, and accordingly in case there is more than one figures of a same color in a picture, these figures can be treated together for the stencil composition process. It is possible to recognize the presence or absence of a background color in a picture, and only if a single background color is recognized, this background color can be perforated separately from the figures.

What is claimed is:

1. A stencil composition processing apparatus for color printing comprising:
   contouring means which scans data of an original picture made up of multiple figures of different colors and detects the profile and color of each figure;
   contact/proximity detection means which detects for each figure as to whether there exists any other figure of different color in contact with or close to a prescribed surrounding area of the figure; and
   grouping control means which groups the figures into multiple groups each including figures that have different colors and are not in contact with nor close to each other based on data provided by said contact/proximity detection means and combines the figure groups so as to cover figures of all colors that make up the original picture.

2. A stencil composition processing apparatus according to claim 1 further including perforation means which implements the perforation of stencil sheets for each figure group based on the combination of groups obtained by the grouping control means.

3. A stencil composition processing apparatus according to claim 2 further including mode selection means which selects one of stencil composition processing mode in which said contouring means, contact/proximity detection means and grouping control means operate in unison to produce stencil composition data for multiple stencil sheets of an original picture and perforation processing mode in which said perforation means operates based on the stencil composition data obtained in the stencil composition processing mode.

4. A stencil composition processing apparatus according to claim 3, wherein, in case there is more than one combination of figure groups that covers figures of all colors, said grouping control means compares the shortest distances, each being between figures within a group, among all combinations of figure groups, and selects a combination of figure groups of the longest distance.

5. A stencil composition processing apparatus according to claim 3 including means of evaluating the number of figures and number of colors based on data of profiles and colors of figures obtained by said contouring means.

6. A stencil composition processing apparatus according to claim 3 including means of detecting the presence or absence of a background color of an original picture based on the detection of the color of a portion other than the figures of the original picture.

7. A stencil composition processing apparatus according to claim 6, wherein, in response to the detection of a single background color in the original picture by said background color detection means, said perforation means implements the perforation for the background color portion separately from the figures.

8. A stencil composition processing method comprising:
   a first step of scanning data of an original picture made up of multiple figures of different colors and detecting the profile and color of each figure;
   a second step of detecting for each figure as to whether there exists any other figure of different color in contact with or close to a prescribed surrounding area of the figure;
   a third step of grouping the figures into multiple groups each including figures that have different colors and are not in contact with nor close to other figures; and
   a fourth step of combining the figure groups so as to cover figures of all colors that make up the original picture.

9. A stencil composition processing method according to claim 8 further including a fifth step of implementing the perforation separately for each figure group based on the combination of figure groups obtained by said fourth step.

10. A stencil composition processing method according to claim 8, wherein, in case there is more than one combination of figure groups that covers figures of all colors, said fourth step compares the shortest distances, each being between figures within a group, among all combinations of figure groups, and selects a combination of figure groups of the longest distance.

11. A stencil composition processing method according to claim 8 including a step of evaluating the number of figures and number of colors based on data of profiles and colors of figures obtained by said first step.

12. A stencil composition processing method according to claim 9 including a step of detecting the color of a portion other than the figures of an original picture, and, in response to the detection of a single background color in the original picture, said fifth step implementing the perforation for the background color portion separately from the figures.

* * * * *